(12) United States Patent
Gotkis et al.

(10) Patent No.: US 7,204,639 B1
(45) Date of Patent: Apr. 17, 2007

(54) METHOD AND APPARATUS FOR THIN METAL FILM THICKNESS MEASUREMENT

(75) Inventors: Yehiel Gotkis, Fremont, CA (US); Mikhail Korolik, San Jose, CA (US)

(73) Assignee: Lam Research Corporation, Fremont, CA (US)

(*) Notice: Subject to any disclaimer, the term of this patent is extended or adjusted under 35 U.S.C. 154(b) by 0 days.

(21) Appl. No.: 10/672,019

(22) Filed: Sep. 26, 2003

(51) Int. Cl.
*G01N 25/00* (2006.01)
*G01J 5/00* (2006.01)

(52) U.S. Cl. .......................... 374/7; 374/121
(58) Field of Classification Search .................... 374/5, 374/6, 7, 121, 141, 131, 45, 57; 451/5, 6, 451/7, 8, 41; 356/630
See application file for complete search history.

(56) References Cited

U.S. PATENT DOCUMENTS

| | | | | |
|---|---|---|---|---|
| 3,413,474 A | * | 11/1968 | Freeh | 374/7 |
| 4,513,384 A | * | 4/1985 | Rosencwaig | 702/170 |
| 5,166,080 A | * | 11/1992 | Schietinger et al. | 438/7 |
| 5,258,824 A | * | 11/1993 | Carlson et al. | 356/632 |
| 5,377,126 A | * | 12/1994 | Flik et al. | 700/300 |
| 5,643,050 A | * | 7/1997 | Chen | 451/10 |
| 5,748,317 A | * | 5/1998 | Maris et al. | 356/502 |
| 6,000,844 A | * | 12/1999 | Cramer et al. | 374/5 |
| 6,069,703 A | * | 5/2000 | Banet et al. | 356/432 |
| 6,108,091 A | * | 8/2000 | Pecen et al. | 356/630 |
| 6,159,073 A | * | 12/2000 | Wiswesser et al. | 451/6 |
| 6,224,460 B1 | * | 5/2001 | Dunton et al. | 451/6 |
| 6,426,232 B1 | * | 7/2002 | Litvak | 438/8 |
| 6,464,561 B2 | * | 10/2002 | Sandhu et al. | 451/5 |
| 6,488,568 B1 | * | 12/2002 | Treur et al. | 451/6 |
| 6,654,132 B1 | * | 11/2003 | Schietinger et al. | 356/630 |
| 2002/0031164 A1 | * | 3/2002 | Scheidt et al. | 374/7 |
| 2003/0008600 A1 | * | 1/2003 | Ide | 451/41 |
| 2004/0033761 A1 | * | 2/2004 | Ono et al. | 451/8 |
| 2004/0203328 A1 | * | 10/2004 | Tada et al. | 438/8 |

* cited by examiner

*Primary Examiner*—Gail Verbitsky
*Assistant Examiner*—Mirellys Jagan
(74) *Attorney, Agent, or Firm*—Martine Penilla & Gencarella, LLP

(57) ABSTRACT

A method for measuring a metal film thickness is provided. The method initiates with heating a region of interest of a metal film with a defined amount of heat energy. Then, a temperature of the metal film is measured. Next, a thickness of the metal film is calculated based upon the temperature and the defined amount of heat energy. A chemical mechanical planarization system capable of detecting a thin metal film through the detection of heat transfer dynamics is also provided.

10 Claims, 7 Drawing Sheets

METHOD AND APPARATUS FOR THIN METAL FILM THICKNESS MEASUREMENT

BACKGROUND OF THE INVENTION

The invention relates generally to semiconductor fabrication and more specifically to in-line metrology for process control during wafer processing.

During semiconductor fabrication, in-line and in-situ metrology for process control and/or verification is commonly used. Inductive sensors, frequently referred to as eddy current sensors (ECS), were recently introduced for semiconductor metrology for metal film thickness monitoring. Materials introduced from the alternative to the eddy current sensor side of the film helped to enhance dramatically sensor sensitivity especially in the thin film range, thereby allowing ECS to perform real-time measurements both in-situ by utilizing wafer carrier built-in sensors, as well as stand-alone units for 3-CMP wafer characterization.

However, one shortcoming with ECS at the enhanced sensitivity mode is that the silicon substrate, as well as numerous other conductive objects located within the ECS sensing vicinity, contribute to the total signal. Consequently, the interpretation of the ECS readings introduce significant uncertainty, especially in the low thickness range, which places limitations upon the measurement capabilities especially for ultra-thin reasonably high resistivity diffusion barrier films, i.e., tantalum and tantalum nitride barrier films. Furthermore, the eddy currents generated within the thin film and within the substrate are inductively coupled. This inductive coupling seriously affects the thin film lower sensitivity.

In view of the foregoing, there is a need to provide a method and apparatus that is capable of monitoring the barrier film thickness in order to provide an in-line metrology device capable of providing accurate thin metal film thickness.

SUMMARY OF THE INVENTION

Broadly speaking, the present invention fills these needs by providing a method and apparatus capable of providing a thickness of a thin metal film through heat transfer dynamics detected during the processing. It should be appreciated that the present invention can be implemented in numerous ways, including as an apparatus, a system, a device, or a method. Several inventive embodiments of the present invention are described below.

In accordance with one embodiment, a method for measuring a metal film thickness is provided. The method initiates with heating a region of interest of a metal film with a defined amount of heat energy. Then, a temperature of the metal film is measured. Next, a thickness of the metal film is calculated based upon the temperature and the defined amount of heat energy.

In another embodiment, a method for determining a thickness of a metal film barrier is provided. The method initiates with delivering a defined amount of heat energy to a region of interest of the metal film barrier. Then, a heat transfer rate of the defined amount of heat energy along the metal film barrier is detected. Next, the thickness of the metal film barrier is determined based upon the heat transfer rate.

In accordance with yet another embodiment, a chemical mechanical planarization (CMP) system is provided. The CMP system includes a wafer carrier configured to support a wafer during a planarization process. The wafer carrier includes a sensor configured to detect heat energy. An impulse heater configured to deliver a defined heat energy pulse to a metal layer disposed on the wafer is included. A computing device in communication with the sensor is included. The computing device is configured to calculate a thickness of the metal layer based upon the detected heat energy in relation to the defined heat energy pulse.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION OF THE PREFERRED EMBODIMENTS

Several exemplary embodiments of the invention will now be described in detail with reference to the accompanying drawings. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The embodiments described herein provide a scheme that is based on monitoring metal thin film heat transfer properties in order to determine a thin film thickness. It should be appreciated that the upper processed metal layer for a wafer will have high thermal conductivity which is normally deposited over a very poor thermal conductive dielectric layer, e.g., a silicon dioxide layer. Accordingly, the metal thin film is thermally insulated. As described below in more detail, a heat energy pulse delivered to a certain section of the metal layer will be propagated mostly along the metal film. The heat energy pulse is essentially transparent to the substrate, over which the dielectric layer is deposited, as well as being transparent to the dielectric layer. The film temperature distribution is a function of film thickness and thermal conductivity. Thus, by introducing a well-defined amount of heat energy and then measuring the temperature of the thin film at the location where the heat energy was delivered, or at a certain distance away from this location, or even at the location after a certain post-heat delay time, enables the capability of determining the film thickness of the metal layer through heat transfer dynamics analysis.

Figure 1:
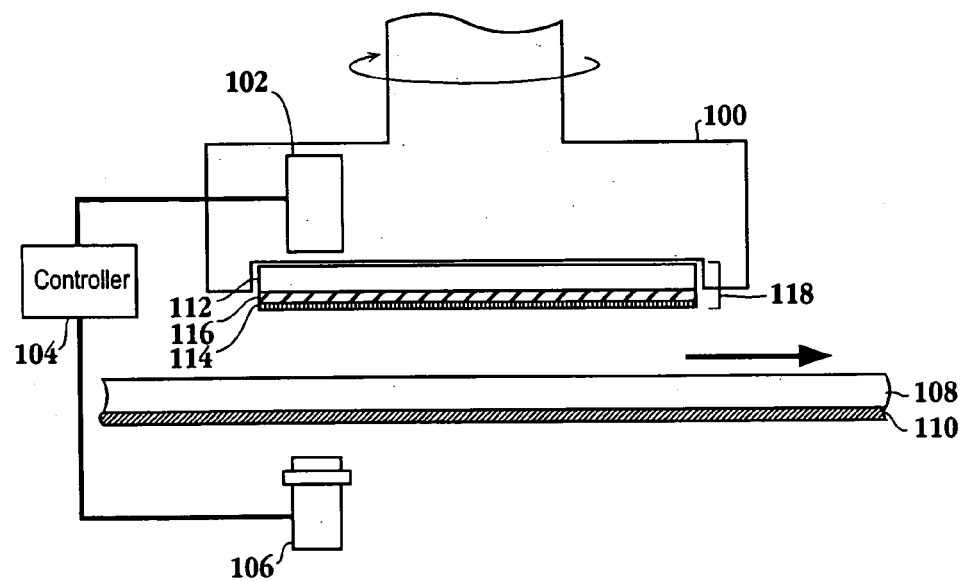
FIG. 1 is a simplified schematic diagram of a chemical mechanical planarization (CMP) system configured to determine a metal film thickness through heat transfer dynamics in accordance with one embodiment of the invention.

FIG. 1 is a simplified schematic diagram of a chemical mechanical planarization (CMP) system configured to determine a metal film thickness through heat transfer dynamics in accordance with one embodiment of the invention. Wafer carrier 100, which rotates about its axis, includes heater 102 embedded therein. Wafer carrier 100 is configured to support wafer 118 during a chemical mechanical planarization (CMP) operation. Wafer 118 includes silicon substrate 112 having insulated dielectric layer 116 disposed thereover, and metal film layer 114 disposed over the dielectric layer. Heater 102 is in communication with controller 104, where the controller is also in communication with heat sensor 106. During the CMP operation wafer carrier 100 supports wafer 118 against polishing pad 108 in order to planarize metal film 114. Polishing pad 108 is disposed over stainless steel backing 110.

Still referring to FIG. 1, in one embodiment, heater 102 is configured to deliver a pulse of infrared energy to a location defined on metal film layer 114. The infrared pulse may be converted into a heat radiation pulse, which may be infrared wide range, infrared single wavelength, halogen bulb light, or any suitable heat radiation pulse that induces a sharp, well focused and localized heating pulse. Sensor 106 is configured to detect a signal indicating the temperature at the location where a heat pulse is delivered from heater 102. In another embodiment, sensor 106 is positioned to detect a signal indicating the temperature of a location different from the location where the heat pulse is delivered. Thus, computation of the thickness of metal layer 114 may be made based upon the amount of heat energy delivered to the location on the metal film and the temperature detected at the location, or nearby to the location, where the heat energy was delivered. Here, controller 104 is a computing device in which the parameters discussed above are manipulated in order to determine the metal film thickness. In one embodiment, controller 104 is a general computing device either storing or having access to calibration curves generated through test wafers having different metal film thicknesses. The data of the blanket test wafers (BTW) or patterned test wafers (PTW) having different metal film thicknesses will correlate the temperature over time for a metal film layer having a certain thickness as discussed below with reference to FIG. 3, based upon the amount of heat energy delivered from heater 102.

Figure 2A:
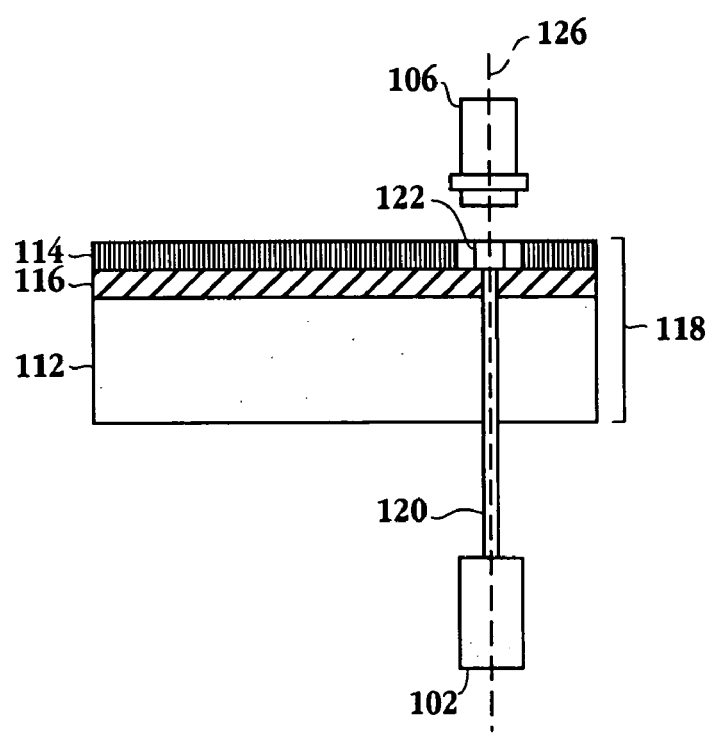
FIGS. 2A through 2D are simplified schematic diagrams illustrating various configurations for the sensor and the heater in accordance with one embodiment of the invention.

FIGS. 2A through 2D are simplified schematic diagrams illustrating various configurations for the sensor and the heater in accordance with one embodiment of the invention. FIG. 2A illustrates a configuration where heater 102 and sensor 106 are located along axis 126 on opposing sides of wafer 118. Here, heater 102 delivers an energy pulse 120 of heat energy to region 122 defined within metal layer 114 of substrate 118. Region 122 may also be referred to as a region of interest. Sensor 106 is configured to detect a signal indicating a temperature associated with region 122. As mentioned above, heater 102 may be an infrared impulse heater. In this embodiment, the infrared impulse heater 102 generates a pulse of infrared heat energy 120, which is transparent to silicon substrate layer 112 and dielectric layer 116. As mentioned previously, dielectric layer may be any suitable thermally insulating material, e.g., silicon dioxide. Metal layer 114 is not transparent to infrared energy pulse 120. As a result, metal layer 114 absorbs the heat energy, which may be in the form of infrared energy. The absorption of the infrared energy causes a corresponding temperature increase at region 122. This temperature increase is detected through sensor 106.

Figure 2B:
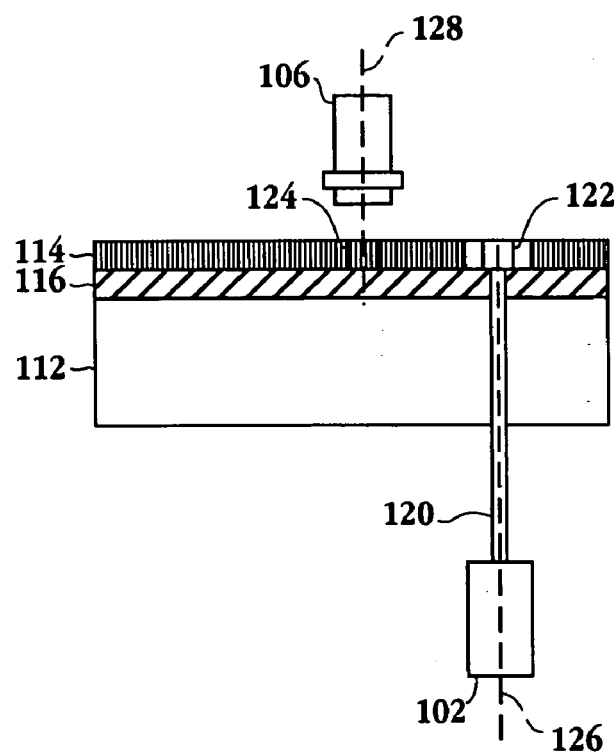

FIG. 2B represents an alternative configuration of FIG. 2A. Here, sensor 106 and impulse heater 102 are offset from each other. That is, sensor 106 and impulse heater 102 do not share the same axis as depicted in FIG. 2A. Thus, impulse heater 102 delivers a pulse of heat energy 120 along axis 126 to region 122 within metal layer 114. Sensor 106 then detects a temperature within metal layer 114 at region 124 which is located along axis 128. It should be appreciated that in one embodiment, the sensing of temperature at region 124 is delayed from the delivery of heat energy to region 122. One skilled in the art will appreciate that the delay may be induced through delay circuitry included with either sensor 106 or the controller in communication with the sensor. It should be appreciated that as the thickness of metal film 114 increases, the dissipation rate associated with heat energy delivered to region 122 also increases. That is, since there is more metal to dissipate the heat as the thickness increases, the heat dissipation rate will be greater. Thus, for a given thickness, the heat dissipation rate, or the temperature over time, may be captured in calibration curves defined by running BTW and PTW having metal film layer numerous thicknesses. Moreover, the temperature or heat dissipation rate may be recorded at various locations within metal film layer 114. This data is stored for subsequent comparison with real-time data in order to determine a corresponding thickness associated with the metal layer based upon the detected temperature and the level of heat energy pulse delivered to the region of interest. It should be appreciated that the various locations referred to within metal film layer 114 may be offset from the region of interest. Thus, calibration curves corresponding to metal film layers having various thicknesses are generated. Accordingly, the temperature detected by sensor 106 provides information in which the computing device mentioned above, with reference to FIG. 1, may use along with the generated calibration curves mentioned above, in order to determine the thickness of metal layer 114.

Figure 2C:
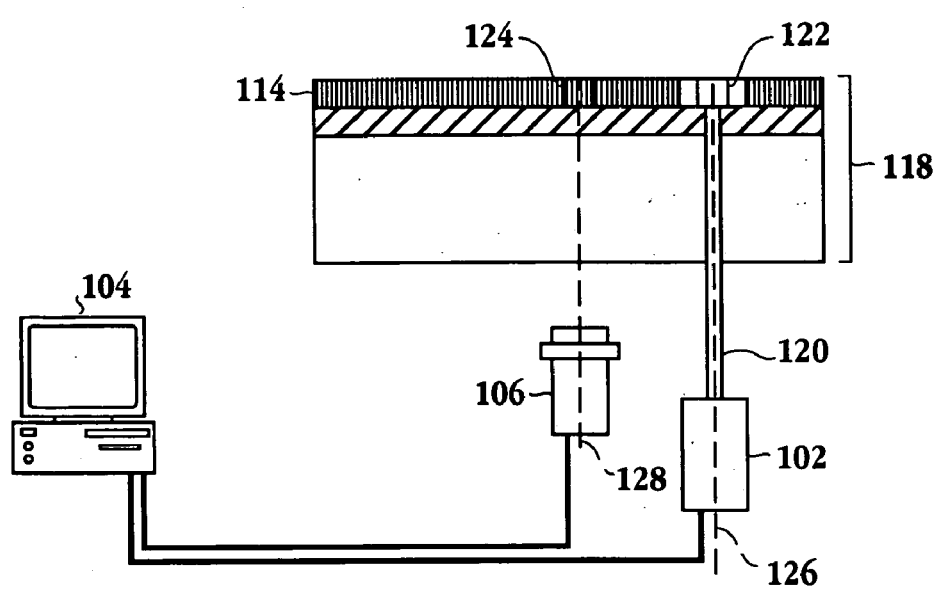
Figure 2D:
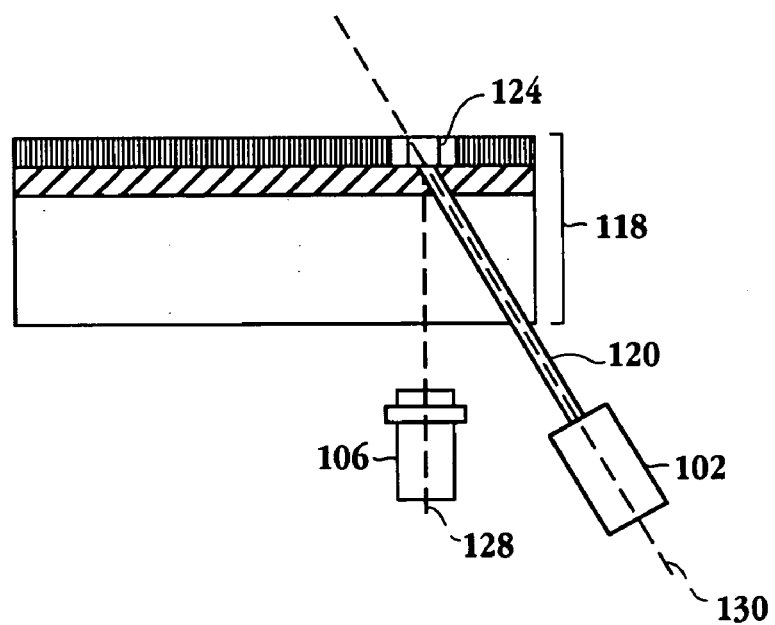

FIG. 2C illustrates another alternative configuration to FIG. 2A. Here, sensor 106 and impulse heater 102 are positioned along separate axes, 128 and 126, respectively, as illustrated in FIG. 2B. However, sensor 106 and impulse heater 102 are positioned on the same side of substrate 118, rather than opposing sides. Controller 104, also referred to as a general computing device, is configured to trigger impulse heater 102 to deliver a predefined heat energy pulse 120 to region 122 of metal layer 114. After a certain time period, controller 104 determines the temperature within region 124 through a signal detected by sensor 106. As described above, controller 104 has access to data that correlates known thicknesses of layer 114 to heat dissipation rates or temperatures, i.e., calibration curves. It will be apparent to one skilled in the art that while sensor 106 and heater 102 are shown at the bottom side of substrate 118, the heater and the sensor may also be placed at the top side of the substrate. FIG. 2D is yet another alternative embodiment to the configuration of the heater and sensor of FIGS. 2A through 2C. Here, sensor 102 is located along axis 130 and delivers heat energy pulse 120 to region 124 at an angle relative to axis 128 associated with sensor 106. The angle between axis 130 and axis 128 may be any suitable angle. In addition, sensor 106 does not necessarily have to be normal to substrate 118. That is, sensor 106 may be positioned at any suitable angle relative to the plane of the surface substrate 118. In one embodiment, the angle of the axis of sensor 106 relative to the axis of impulse heater 102 minimizes reflected heat energy being detected by the sensor.

Still yet another embodiment may include at least two sensors configured to detect a signal indicating a temperature, where the two sensors detect signals emanating from different locations. That is, two different points away from the region of interest are monitored. Alternatively, two different delay times from the same spot may be monitored, through a common sensor or through independent sensors. In either case, the heat dissipation constant may be determined without requiring a reproducible heat inducing pulse from the impulse heater. One skilled in the art will appreciate that the heat dissipation constant is a function of thickness and is calibrated in terms of thickness. Therefore, through the heat dissipation constant, the thickness may be determined. The corresponding calibration curves associated with the two different points or the two different delay times will have the same shape but different amplitudes.

Figure 3:
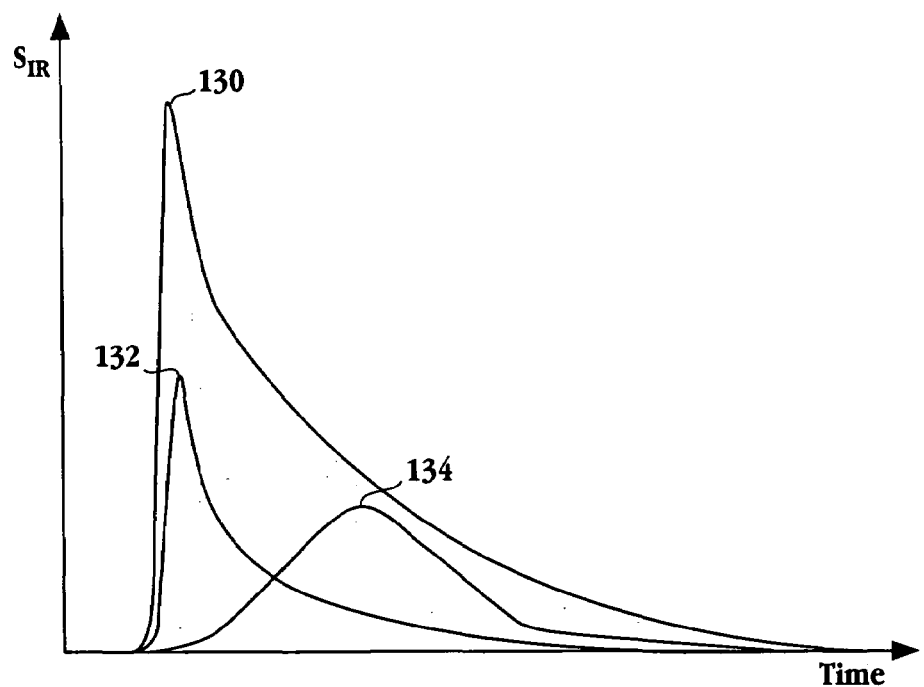
FIG. 3 is a graph illustrating the relationship between a signal detected by the sensor over time in accordance with one embodiment of the invention.

FIG. 3 is a graph illustrating the relationship between a signal detected by the sensor over time in accordance with one embodiment of the invention. As can be seen, three curves are illustrated. Curve 130 illustrates a response for a thin metal film, curve 132 illustrates a response for a thick metal film, and curve 134 illustrates the response where the sensor is offset from the impulse heater. Thus, curves 130 and 132 are associated with the configurations depicted in FIGS. 1, 2A and 2D, while curve 134 is associated with the configurations depicted in FIGS. 2B and 2C. Curve 130 and curve 132 illustrate the relative temperature rise for a thin metal film and a thicker metal film. That is, where the sensors of FIGS. 1 through 2D are configured to detect an infrared signal, the signal associated with a thinner metal film corresponds to a greater initial temperature than the initial temperature associated with the thick metal film. As mentioned above, the thinner metal film cannot dissipate the heat as quickly as a thicker metal film, due to the amount of metal capable for dissipating the heat energy. Curve 134 illustrates the delay when the sensor is offset from the axis of the impulse heater and monitors a different region than where the heat energy is delivered. Thus, with respect to FIGS. 2B and 2C, the peak of curve 134 will move along the time axis as a function of a distance between regions 122 and 124. Furthermore, with each of curves 130, 132, and 134, the lower the temperature after a certain wait period will correspond to a thicker film. That is, the thicker film will have a higher heat dissipation rate thus the temperature will be lower relative to a thinner film where the same heat pulse is applied.

One skilled in the art will appreciate that numerous calibration curves may be generated through tests with BTW and PTW. The data generated through these tests may be stored on a suitable storage medium for use in determining the thickness. Furthermore, the calibration curve data may be incorporated into the sensor detecting the heat energy so that the signal may be translated at the sensor and converted to a thickness.

Figure 4:
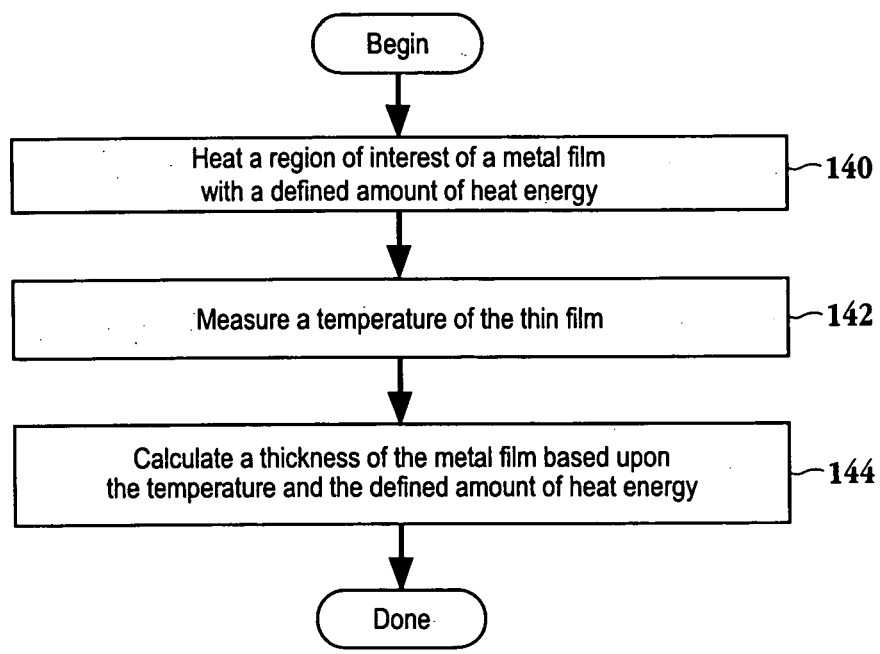
FIG. 4 is a flow chart of the method operations for measuring a film thickness according to heat transfer dynamics in accordance with one embodiment of the invention.

FIG. 4 is a flow chart of the method operations for measuring a film thickness according to heat transfer dynamics in accordance with one embodiment of the invention. The method initiates with operation 140 where a region of interest of a metal film is heated with a defined amount of heat energy. Here, the region of interest corresponds to a location on the metal film where a pulse of heat energy is delivered as discussed with reference to FIGS. 1 through 2D. In one embodiment, the heat energy is infrared energy. In another embodiment, the heat energy is substantially transparent to layers of the substrate except the metal film layer. The method then advances to operation 142 where the temperature of the thin film is measured. In one embodiment, the temperature of the thin film is detected through an infrared signal that indicates a temperature associated with the region of interest. As described above, the sensor may be positioned to monitor the temperature of the region of interest or a location separate from the region of interest.

The method of FIG. 4 then advances to operation 144 where a thickness of the metal film is calculated based upon the temperature and the defined amount of heat energy. In one embodiment, the calculation includes defining a calibration curve correlating the temperature over time associated with a location on the metal film having a certain thickness. Thus, the thickness may be determined from the detected temperature provided by the sensor and associated time parameter. That is, the temperature and time parameter will correspond to a point on a graph such as the graph of FIG. 3, thereby defining a thickness. Of course, the configuration of the sensor and the heater, i.e., whether they are offset from each other will depend on which calibration curve is used to determine the thickness.

In summary, the embodiments described above enable the use of heat transfer dynamics to extract information metal film thickness parameters. Accordingly, barrier film thickness, e.g., tantalum and tantalum nitride barriers, may be accurately monitored through the detection of the heat transfer dynamics described above. Thus, the obstacles of monitoring the barrier film thickness with eddy current sensors have been overcome by exploiting the thermal properties of the thin films as described herein. As the film temperature distribution is dependent on time, coordinates, thermal conductivity, and thickness, the thickness may be determined when the other parameters are known. That is, the time of measuring the temperature relative to the delivery of the heat energy pulse is known, and the coordinates of the monitoring location relative to the location of delivery of the heat energy pulse are known. Thus, the thermal conductivity properties captured through the calibration curve generated from test wafers may be used to compare with the thermal conductivity properties monitored from a wafer being processed during a semiconductor processing operation where it is desirable to determine the thickness of a thin metal film. It should be appreciated that the embodiments described above are capable of detecting a thin metal film having a thickness between about 5000 Angstroms to about 10 angstroms.

One skilled in the art will appreciate that the embodiments described herein may be applied as a process development tool. That is, during qualification of a new tool, tests may be run to qualify the tool. For example, a CMP tool may be qualified to validate that the tool is performing acceptably to monitor the thin metal film thickness as described above. Additionally, while the embodiments are described with reference to the metal layer being thermally insulated, one skilled in the art will appreciate that the embodiments may be extended to metal films disposed over any suitable non-conductive film or films. The embodiments can also be extended to metal films disposed over any suitable conductive film or films. Here, the heat transfer between layers is taken into account.

In summary, the present invention provides for the generation and analysis of a stress map associated with a substrate being processed during a semiconductor processing operation. A proximity sensor, e.g., an eddy current sensor, is used to detect a signal associated with a level of mechanical stress being experienced at a location on the substrate. A temperature sensor, e.g., an infrared sensor, is used to detect a signal associated with thermal stress being experienced at the substrate surface. A stress map is then generated from multiple signals, in one embodiment. Analysis of the stress map reveals areas of the substrate experiencing stress conditions. Thereafter, corrective action to relieve the stress condition is instituted. For example, if a high temperature or high stress region is located on one portion of the substrate, processing parameters may be adjusted differentially to relieve the stress at the corresponding portion of the substrate.

It should be appreciated that while the embodiments have been described in terms of a CMP process, the embodiments are not limited to a CMP process. For example, the sensors may be used within any semiconductor process that removes or deposits a layer or film on a substrate, such as etch, deposition and photoresist stripping processes. Furthermore, the above described embodiments may be applied to rotary or orbital type CMP systems as well as the belt type CMP system.

The embodiments described herein also provide for a CMP system that is configured to differentially control removal rates being applied to regions of a wafer. The differential control enables for a uniform thickness to be obtained as opposed to a uniform removal rate. The differential control additionally allows for identified portions of the substrate having a high stress condition to be targeted for relief.

The invention has been described herein in terms of several exemplary embodiments. Other embodiments of the invention will be apparent to those skilled in the art from consideration of the specification and practice of the invention. The embodiments and preferred features described above should be considered exemplary, with the invention being defined by the appended claims.

What is claimed is:

1. A chemical mechanical planarization (CMP) system, comprising:
    a wafer carrier configured to support a wafer during a planarization process;
    an impulse heater configured to deliver a single defined heat energy pulse to a metal layer disposed on the wafer;
    a sensor embedded in the wafer carrier, the sensor configured to detect heat energy emanating from a location on the metal layer due to the heat energy pulse, the sensor located to minimize reception of a reflected heat energy pulse from the defined heat energy pulse, the sensor is positioned to detect the heat energy emanating from a location on the metal layer that is different from where the impulse heater delivers the defined heat energy pulse to the metal layer; and
    a computing device in communication with the sensor, the computing device configured to calculate a thickness of the metal layer based upon the detected heat energy in relation to the defined heat energy pulse.

2. The system of claim 1, wherein the sensor is an infrared sensor.

3. The system of claim 1, wherein the heat energy is infrared heat energy.

4. The system of claim 1, wherein the computing device includes a storage device storing a calibration curve relating the heat energy pulse and the detected heat energy to the thickness.

5. The system of claim 1, wherein the computing device is configured to calculate a heat transfer rate from values associated with the detected energy and the defined heat energy pulse.

6. The system of claim 1, wherein an axis of the impulse heater is different from an axis of the sensor.

7. The system of claim 1, wherein the computing device includes,
    delay circuitry for delaying detection of the heat energy for a period of time after delivering the defined heat energy pulse.

8. A system for detecting a thickness of a metal layer during a chemical mechanical planarization process without contacting the metal layer, comprising:
    an infrared impulse heater configured to deliver a single defined heat energy pulse to a metal layer disposed on a wafer;
    an infrared sensor configured to detect heat energy emanating from a location on the metal layer caused by the heat energy pulse, such that the sensor is positioned to substantially eliminate reception of a reflected heat energy pulse from the defined heat energy pulse, the location on the metal layer that the sensor detects the heat energy emanating from being different from a location where the impulse heater delivers the defined heat energy pulse to the metal layer; and
    a computing device in communication with the sensor, the computing device configured to calculate a thickness of the metal layer based upon the detected heat energy in relation to the defined heat energy pulse.

9. The system of claim 8, wherein an axis of the sensor and an axis of the impulse heater are substantially orthogonal to a top surface of the metal layer.

10. The system of claim 8, wherein the computing device includes,
    delay circuitry for delaying detection of the detected heat energy for a period of time after delivering the defined heat energy pulse.

* * * * *